(12) United States Patent
Swize

(10) Patent No.: US 7,054,091 B2
(45) Date of Patent: May 30, 2006

(54) DIGITAL PROCESSOR CONTROLLED METHOD AND CIRCUIT FOR RETRACTING A HEAD CARRIAGE ASSEMBLY TO A PARKED POSITION IN A MASS DATA STORAGE DEVICE, OR THE LIKE

(75) Inventor: Gregory Emil Swize, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 212 days.

(21) Appl. No.: 10/604,385

(22) Filed: Jul. 16, 2003

(65) Prior Publication Data

US 2004/0100720 A1 May 27, 2004

Related U.S. Application Data

(60) Provisional application No. 60/319,724, filed on Nov. 23, 2002.

(51) Int. Cl.
*G11B 21/02* (2006.01)

(52) U.S. Cl. ...................................................... 360/75

(58) Field of Classification Search ............. 360/78.04, 360/78.06, 69, 73.01, 78.12, 75
See application file for complete search history.

(56) References Cited

U.S. PATENT DOCUMENTS

| 6,021,015 | A | * | 2/2000 | Jeffrey et al. ............... 360/69 |
| 6,040,671 | A | | 3/2000 | Brito et al. ............... 318/603 |
| 6,184,645 | B1 | | 2/2001 | Brito et al. ............... 318/632 |
| 6,204,629 | B1 | | 3/2001 | Rote et al. ............... 318/803 |
| 6,373,208 | B1 | | 4/2002 | Brito et al. ............... 318/379 |
| 6,512,650 | B1 | * | 1/2003 | Tanner ....................... 360/75 |

* cited by examiner

*Primary Examiner*—David Hudspeth
*Assistant Examiner*—Mitchell Slavitt
(74) *Attorney, Agent, or Firm*—W. Daniel Swayze, Jr.; W. James Brady; Frederick J. Telecky, Jr.

(57) ABSTRACT

A retract circuit (40) for retracting a data transducer carriage assembly (17) of a mass data storage device (10) to a retracted position has a digital state machine (55) that is user programmable to operate in a selected retract mode. An analog control circuit (44) is provided for receiving control signals from the digital state machine (55) for providing analog retract signals to move the data transducer carriage assembly (70). The digital state machine (55) is user programmable to operate in constant voltage, velocity detect, float and pulse, and crash stop detect modes. Preferably, the digital state machine (55) is programmed to detect a velocity of the data transducer carriage assembly (17). The digital state machine (55) also is preferably programmed to detect an error velocity of the data transducer carriage assembly (17) from a difference of a measured voltage across the data transducer driver (22) from a predetermined voltage.

50 Claims, 5 Drawing Sheets

DIGITAL PROCESSOR CONTROLLED METHOD AND CIRCUIT FOR RETRACTING A HEAD CARRIAGE ASSEMBLY TO A PARKED POSITION IN A MASS DATA STORAGE DEVICE, OR THE LIKE

CROSS REFERENCE TO RELATED APPLICATIONS

This application claims priority from copending provisional patent application No. 60/319,724, filed Nov. 23, 2002.

BACKGROUND OF INVENTION

1. Field of Invention

This invention relates to improvements in methods and apparatuses for dynamic information storage or retrieval, and more particularly to improvements in methods and circuitry used in mass data storage devices, and still more particularly to methods and circuits to retract a carriage assembly of the type used to carry a data transducer, or the like, from a spinning data-containing media disk to a rest or retracted position.

2. Relevant Background

Mass data storage devices include well-known hard disk drive assemblies (HDAs). Generally, an HDA includes one or more rotating disks that carry a magnetic or optical media onto which data may be written, and from which previously written data may be read. The data is written to and read from the disk by one or more heads or transducers that are carried on a selectively movable carriage. The carriage assembly is typically moved and positioned by a voice coil motor (VCM), which moves the heads to the desired locations at which data is to be written or read.

Hard disk drives may be used in many applications, including personal computers, set top boxes, video and television applications, audio applications, or some mix thereof. Applications for hard disk drives still being developed, and are expected to further increase significantly in the future.

More particularly, mass data storage devices typically include either magnetic or optical disks for containing the data. The magnetic disk types generally operate by orienting magnetic domains contained on the disk to predetermined positions in dependence upon the data to be established and detected by signals delivered to and from the head. On the other hand, optical disks usually operate by locally varying the optical properties of the disk to provide a reflectivity gradient that can be detected by a laser transducer head, or the like. Both type disks may be used, for example, to contain data, video, music, or other information.

Details of the construction of a typical HDA are shown in copending U.S. patent application Ser. No. 09/464,315, filed Dec. 16, 1999, entitled METHOD AND CIRCUIT FOR OPERATING A VOICE COIL ACTUATOR OF A MASS DATA STORAGE DEVICE, said patent application being assigned to the assignee hereof and incorporated herein by reference. As shown therein, a typical HDA includes a VCM arranged to move one or more arms (sometimes referred to herein as a "carriage" or "carriage assembly") in conjunction with a plurality of rotating disks. The arms may be pivoted about a bearing point to carry and move the heads or data transducers radially inwardly and outwardly within the stack of disks to be enabled to selectively read or write data to the disk media.

The outboard end of the arms carries a coil that is selectively energized by currents from a VCM positioning driver. The coil is located between two magnets, which are spaced apart to allow the arm and coil portions to freely swing therebetween. Thus, as currents from the VCM positioning driver are applied to the coil, magnetic fields are established by the current induced field of coil, which interacts with the fields of magnets to precisely position the heads at desired locations.

In operation, as long as there is relative movement between the disk and head, the head flies above the surface of the disk without actually contacting it. When, however, the disk stops, for example, when the power is removed, the air bearing between the disk and head no longer exists, and the head may fall into contact with the disk, resulting in possible damage to both. Thus, as known, a number of situations exist in which it is desired to move the carriage to a position at which the carriage is "parked" or "landed" so that the heads do not contact the disk. Although one preferred location at which the parked position may be defined is adjacent the outer periphery of the disk, it may be parked at other locations as well, for example, adjacent the inner radius of the disk.

In order to properly move the carriage to the park position in contact with the "crash stops" of the park platform, generally a driving current of some particular pattern is applied to the coil that is of sufficient magnitude to bring the carriage to the park position. However, it will be appreciated that if the carriage is overdriven, the delicate head mechanism and other parts of the carriage may sustain damage. On other hand, if the carriage is underdriven, the head mechanism may not reach the park position, which may result in loss of the air bearing between the head and disk surface, which may also cause damage both to the head mechanism and to the underlying media of the disk assembly above which the heads fly.

A typical retract circuit may incorporate a capacitor powered circuit that stores power that is modulated and applied to the VCM in the event of a power failure. Such pulsed techniques, however, have at least two drawbacks. First, the capacitor must provide sufficient power to adequately drive the carriage to the crash stop in the parked position. If the initial velocity is not properly determined, the capacitor power may not be properly metered, and the carriage may fall short of the target position. Secondly, pulsing the power to the VCM results in acoustic noise, which is undesirable in many instances. Depending on the frequency of the pulsing, the pulsing in itself does not necessarily create noise. Frequencies higher than 20 kHz are inaudible to humans. However, one of the major drawbacks of the capacitor solution is that a capacitor will have to be very large to effectively retract an arm with a lot of inertia. This would be expensive. Additionally, the capacitor solution is generally such that the velocity is not well regulated. This is not popular among drive designers because of the fear that the arms will rattle and damage the disk surface if the heads strike something too hard. There is also the concern that the arm will not be retracted to the landing zone.

Another technique that has been used is a two-stage voltage application in which a first, low voltage is applied to the VCM to move the heads to the base of the landing structure, then a large voltage is applied to the VCM to drive the carriage definitively to the crash-stop of the landing structure. The power source for such technique may be, for example, the BEMF of the spindle motor used to spin the data disk. However, in such techniques, the carriage velocity is a function of physical motor parameters like friction, coil resistance, and torque, which causes the carriage velocity to be inaccurate and unreliable.

Still a third technique which has been used is a sample and drive carriage velocity control scheme. In this scheme the coil of the carriage assembly is floated and the velocity inferred by measuring the BEMF of the coil. The voltage level of the BEMF is directly proportional to the angular velocity of the motor. After the measurement of BEMF, the carriage is driven as needed to force a commanded carriage voltage. This implementation, however, does not allow for sophisticated velocity detection. More sophisticated velocity detection could reduce acoustic emissions.

What is needed, therefore, is a method and circuit for reliably moving the head carriage assembly to a parked position, while generating a minimum amount of acoustic noise, and accurately controlling the carriage velocity.

SUMMARY OF INVENTION

In light of the above, therefore, one advantage achieved by the invention is through the use of digitized velocity error, the needed velocity correction to drive the carriage assembly to a parked position can be accurately determined. The digitization of the velocity error further allows the digital controller (microprocessor) to take more sophisticated responses to non-linear perturbations of the system.

This invention uses a microprocessor in conjunction with a few analog components to achieve the above design objectives. In a broad aspect, the system makes use of one analog driver with programmable gain, two simple analog buffers, and one comparator. Using switches, these four analog blocks may be configured in a variety of ways by the microprocessor. These configurations enable: 1) accurate detection of velocity errors (both positive and negative), 2) the controller to drive the voltage output with programmable gain (both positive and negative), and 3) sophisticated detection of non-linear perturbations, for example, hitting a crash stop. The configuration as currently implemented digitizes the velocity error into two bits, but can easily be generalized into more. This flexibility is inherent to the microprocessor based scheme and is a major advantage of this solution.

Thus, according to a broad aspect of the invention, a retract circuit is presented for retracting a data transducer carriage assembly of a mass data storage device to a retracted position. The retract circuit includes a digital state machine that is user programmable to operate in a selected retract mode. An analog control circuit is provided for receiving control signals from the digital state machine, for receiving analog feedback from the carriage assembly, and for providing analog retract signals to move the data transducer carriage assembly.

In a preferred embodiment, the digital state machine is user programmable to operate in constant voltage, velocity detect, fixed time-out, and crash stop detect modes. Basically, the last three retract modes all work in the same way. All of them make a measurement of the velocity error, and then generate a driving voltage to force the velocity error to zero. The only difference among the last three codes is in what manner the state machine is allowed to go into a state that repeats the correction process until the control loop has been unable to reach the desired velocity. The crash stop detect mode exits slightly early by trying to detect when the crash stop was hit. The crash stop detect mode will still exit if the circuitry is unable to speed up the carriage after 16 counts. The velocity detect mode attempts to exit even earlier—it tries to go to an exit state when velocity is reached. If that doesn't happen, it will try to exit based on hitting a crash stop, and finally it will exit to the exit state if it counts for 16 cycles and never reaches speed. Preferably, the digital state machine is programmed to one of the last three modes, which seek to control the velocity of the data transducer carriage assembly. The digital state machine also is preferably programmed to detect an error velocity of the data transducer carriage assembly from a difference of a measured voltage across the data transducer driver from a predetermined voltage.

According to another broad aspect of the invention, a retract circuit is presented for retracting a data transducer carriage assembly of a mass data storage device to a retracted position. The retract circuit has means for establishing a digital state machine; the means for establishing a digital state machine being user programmable to operate in a selected retract mode. The retract circuit also includes means for establishing an analog control circuit for receiving control signals from the means for establishing a digital state machine for providing analog retract signals to move the data transducer carriage assembly.

In one embodiment, means are provided for establishing an analog driver to receive control signals from the means for establishing digital state machine, the means for establishing analog driver having a programmable gain.

In one embodiment, the means for establishing digital state machine is user programmable to operate in constant voltage, velocity detect, fixed time-out, and crash stop detect modes. The means for establishing digital state machine may be programmed to detect a velocity of the data transducer carriage assembly, and may be programmed to detect an error velocity of the data transducer carriage assembly from a difference of a measured voltage across the data transducer driver from a predetermined voltage.

According to still another preferred embodiment of the invention, a mass data storage device is presented. The mass data storage device includes a retract circuit for retracting a data transducer carriage assembly of a mass data storage device to a retracted position that includes a digital state machine that is user programmable to operate in a selected retract mode. An analog control circuit s also provided for receiving control signals from the digital state machine for providing analog retract signals to move the data transducer carriage assembly.

In one embodiment, an analog driver is provided to receive control signals from the digital state machine, the analog driver having a programmable gain.

In one embodiment, the digital state machine is user programmable to operate in constant voltage, velocity detect, float and pulse, and crash stop detect modes. The digital state machine also may be programmed to detect a velocity of the data transducer carriage assembly, and may be programmed to detect an error velocity of the data transducer carriage assembly from a difference of a measured voltage across the data transducer driver from a predetermined voltage.

According to yet another broad aspect of the invention, a method is provided for retracting a data transducer carriage assembly of a mass data storage device to a retracted position. The method includes providing a user programmable digital state machine to operate in a selected retract mode; and providing analog control circuit in response to signals provided by the digital state machine for providing analog retract signals to the data transducer carriage assembly.

In one embodiment, providing a digital state machine may include providing a digital state machine that is user programmable to operate in constant voltage, velocity detect, float and pulse, and crash stop detect modes.

In one embodiment, providing a digital state machine may include providing a digital state machine that is programmed to detect a velocity of the data transducer carriage assembly.

In one embodiment, providing a digital state machine may include providing a digital state machine that is programmed to detect an error velocity of the data transducer carriage assembly from a difference of a measured voltage across the data transducer driver from a predetermined voltage.

According to still yet another broad aspect of the invention, a retract system for retracting a head assembly in a hard disk drive is provided. The retract system includes means for measuring a velocity of a voice coil motor (VCM), Means responsive to a velocity measurement for establishing a retract voltage, and means for applying the retract voltage to the VCM are provided.

In one embodiment, the retract system includes a digital processor for configuring the means for measuring, means for establishing a retract voltage, and means for applying the retract voltage to operate in a plurality of operating modes.

In still yet another broad aspect of the invention, in a hard disk drive, a system is presented for moving a head assembly to a retract position, a position of the head assembly being controlled by a voice coil motor. The system includes an analog section connected to the voice coil motor to apply controllable drive voltages thereto to selectively position the head assembly, and a digital section connected to receive signals from the analog section and the hard disk drive that reflect operating conditions of the hard disk drive. The digital section includes a digital state machine defining a number of operating states, the digital state machine moving from state to state in response to conditions in the hard disk drive, and operating to produce digital command signals including a retract command to control the analog section to move the head assembly to the retract position A decoder and digital to analog converter decode the digital command signals and convert the digital command signals to analog signals for controlling the analog section.

In one embodiment the digital state machine includes states to determine a current velocity of the head assembly and to produce command signals to the analog section to command the analog section to apply a retract voltage related to the current velocity to the voice coil motor.

In one embodiment, the digital section contains a digital processor connected to configure the state machine to operate in one of a number of operating modes.

According to yet another broad aspect of the invention, a method is presented for retracting a head assembly in a hard disk drive. The method includes measuring a velocity of a voice coil motor (VCM) to determine a measured velocity, establishing a retract voltage responsive to the measured velocity, and applying the retract voltage to the VCM.

In one embodiment the method includes operating the hard disk drive in one of a plurality of selectable operating modes.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
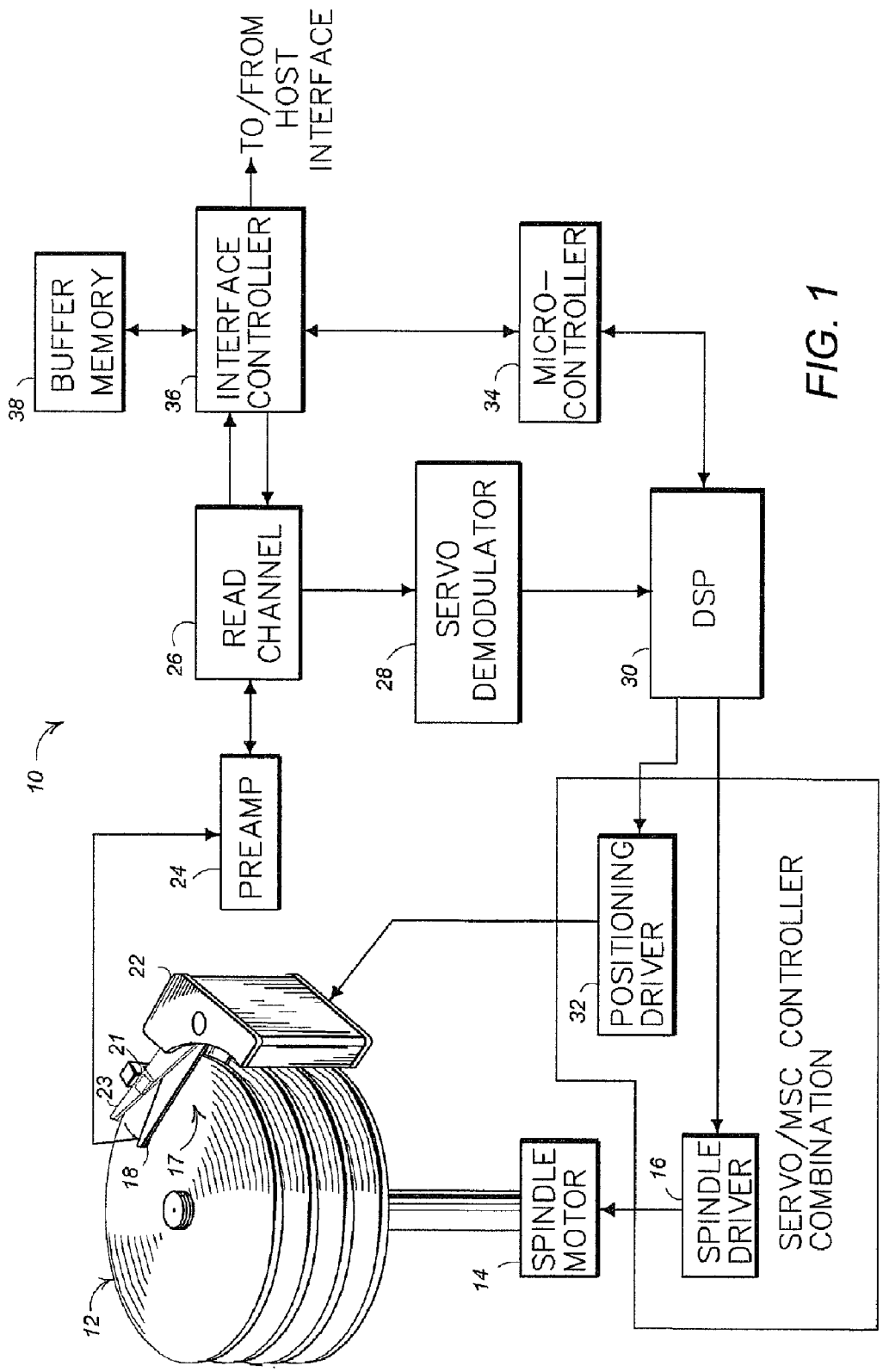
FIG. 1 is a block diagram of a generic disk drive system, illustrating the general environment in which the invention may be practiced.

FIG. 1 is a block diagram of a generic disk drive system 10, which represents the general environment in which the invention may be practiced. The system 10 includes a magnetic media disk 12, or stack of disks as shown, that is rotated by a spindle motor 14 and spindle driver circuit 16. Although a magnetic disk stack 12 is shown, it should be understood that the present invention is equally applicable to other types of disk structures, such as optical disks, or the like.

Data transducers or heads, the uppermost head 18 being shown, are carried on a carriage assembly 17, and are locatable along selectable radial tracks (not shown) of the disks of the disk stack 12 by a voice coil motor 22. The radial tracks may contain magnetic states that contain information about the tracks, such as track identification data, location information, synchronization data, as well as user data, and so forth. The heads may be used both to record user data to and read user data back from the disk stack 12, as well as to detect signals that identify the tracks and sectors at which data is written, and to detect servo bursts that enable the head to be properly laterally aligned with the tracks of the disk stack 12.

Analog electrical signals that are generated by the heads 18 in response to the magnetic signals recorded on the disk stack 12 are preamplified by a preamplifier 24 for delivery to read channel circuitry 26. Servo signals, below described in detail, are detected and demodulated by one or more servo demodulator circuits 28 and processed by a digital signal processor (DSP) 30 to control the position of the heads 18 via the positioning driver circuit 32. The servo data that is read and processed may be analog data that is interpreted by the DSP 30 for positioning the heads 18.

A microcontroller 34 is typically provided to control the DSP 30, as well as an interface controller 36 to enable data to be passed to and from a host interface (not shown) in known manner. A data memory or buffer 38 may be provided, if desired, to buffer data being written to and read from the disk stack 12.

Figure 2:
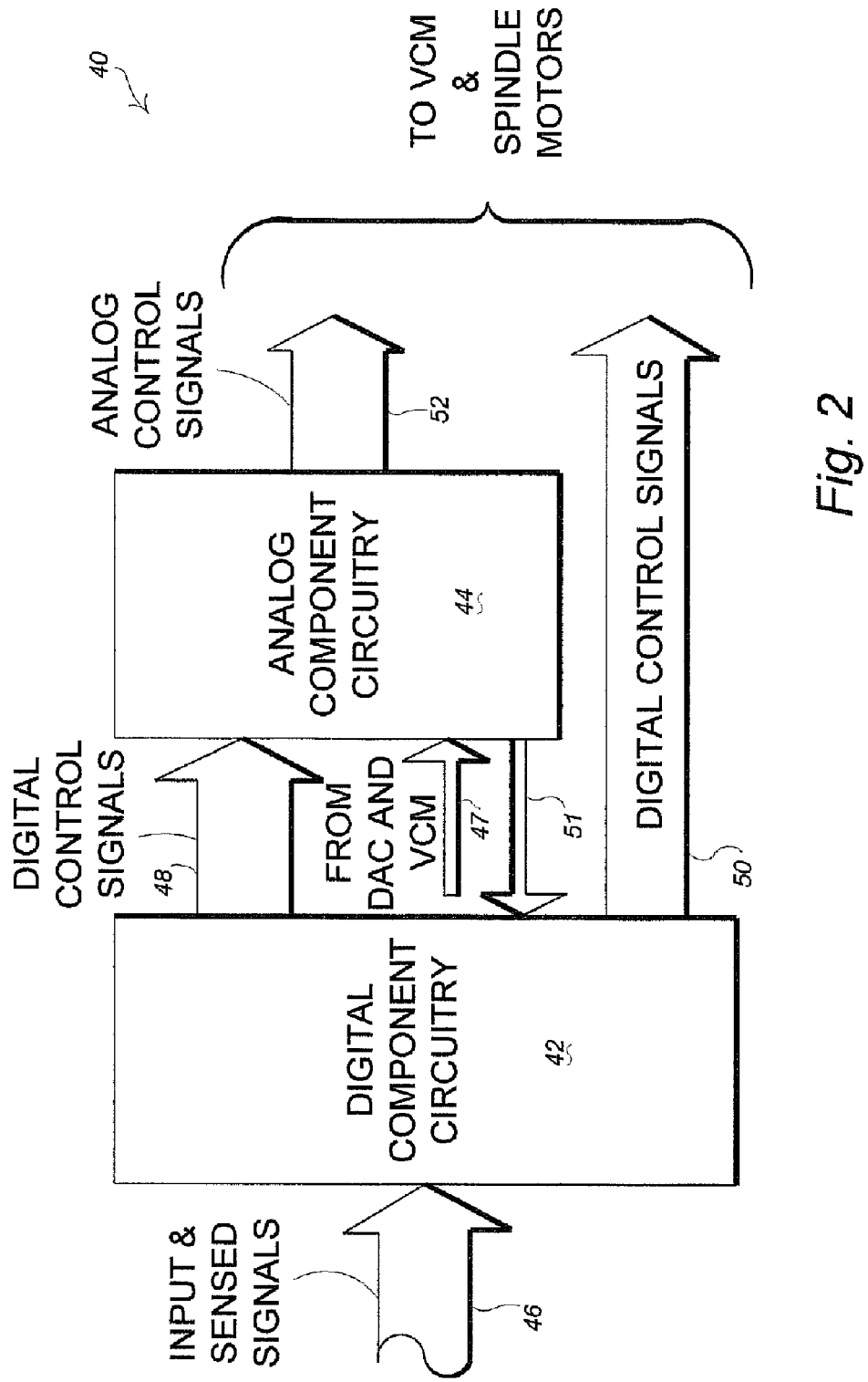
FIG. 2 is a block diagram of retract circuitry, in accordance with a preferred embodiment of the invention.

FIG. 2 is a top level block diagram of a retract circuit 40, in accordance with a preferred embodiment of the invention. The circuit 40 may comprise a part of the circuitry of the positioning driver 32 shown in FIG. 1, and has a digital component box 42 and an analog component box 44, both described in greater detail in respective FIGS. 3 and 4 below. The digital component box 42 contains digital circuitry to process digital signals received on input bus 46 from various other parts of the mass data storage device with which the circuit 40 is associated, and, likewise, the analog component box 44 contains analog circuitry to process digital signals received on input bus 48 from the digital component box 42. The analog component box 44 also receives analog inputs from a DAC and the VCM on lines 47, and provides signals from a comparator output back to the digital component circuitry 42 on lines 51.

The digital component box 42 has additional outputs, represented by bus 50 which are connected to controlling circuitry for the VCM and spindle motors 22 and 14. The analog component box 44 also has analog outputs, represented by bus 52, which also are connected to the controlling circuitry for the VCM 22.

At this juncture, it is noted that various retract modes have been defined, and are further defined herein, which are summarized in Table 1 below:

State Table of Operating Modes

| Code | Mode Name | Description |
| --- | --- | --- |
| 00 | Constant voltage | A constant retract voltage is applied to the head carriage when the retract signal is enabled.* |
| 01 | Velocity detect | The coil of the carriage is floated, the velocity of the carriage is determined, and an appropriate constant retract voltage is applied.* This procedure is repeated until the carriage voltage is equal to the commanded voltage (which implies the carriage velocity is equal to the commanded velocity). After exiting, constant voltage is applied to drive the carriage to the landing zone. |
| 10 | Fixed Time-out | Same procedure as 01, except in this case the procedure is terminated when the system has been unable to reach commanded velocity for 16 counts. After exiting, a constant voltage is applied to hold the carriage there.** |
| 11 | Crash stop detect | Same procedure as 01, except in this case the procedure is ended when the velocity is detected to have changed direction from one sample to the next. After exiting, a constant voltage is applied to hold the carriage there*** |

*As particularly described herein.
**As particularly described in copending provisional patent application serial number 60/319,725, filed on Nov. 23, 2002, (Attorney docket number TI-34160P), and incorporated by reference herein.
***As particularly described in copending provisional patent application serial number 60/319,726, filed on Nov. 23, 2002, (Attorney docket number TI-34161 P), and incorporated by reference herein.

The various operating modes have been numbered for convenience, and may be hereinafter referred to either by the mode name or the code number specified associated therewith.

Figure 3:
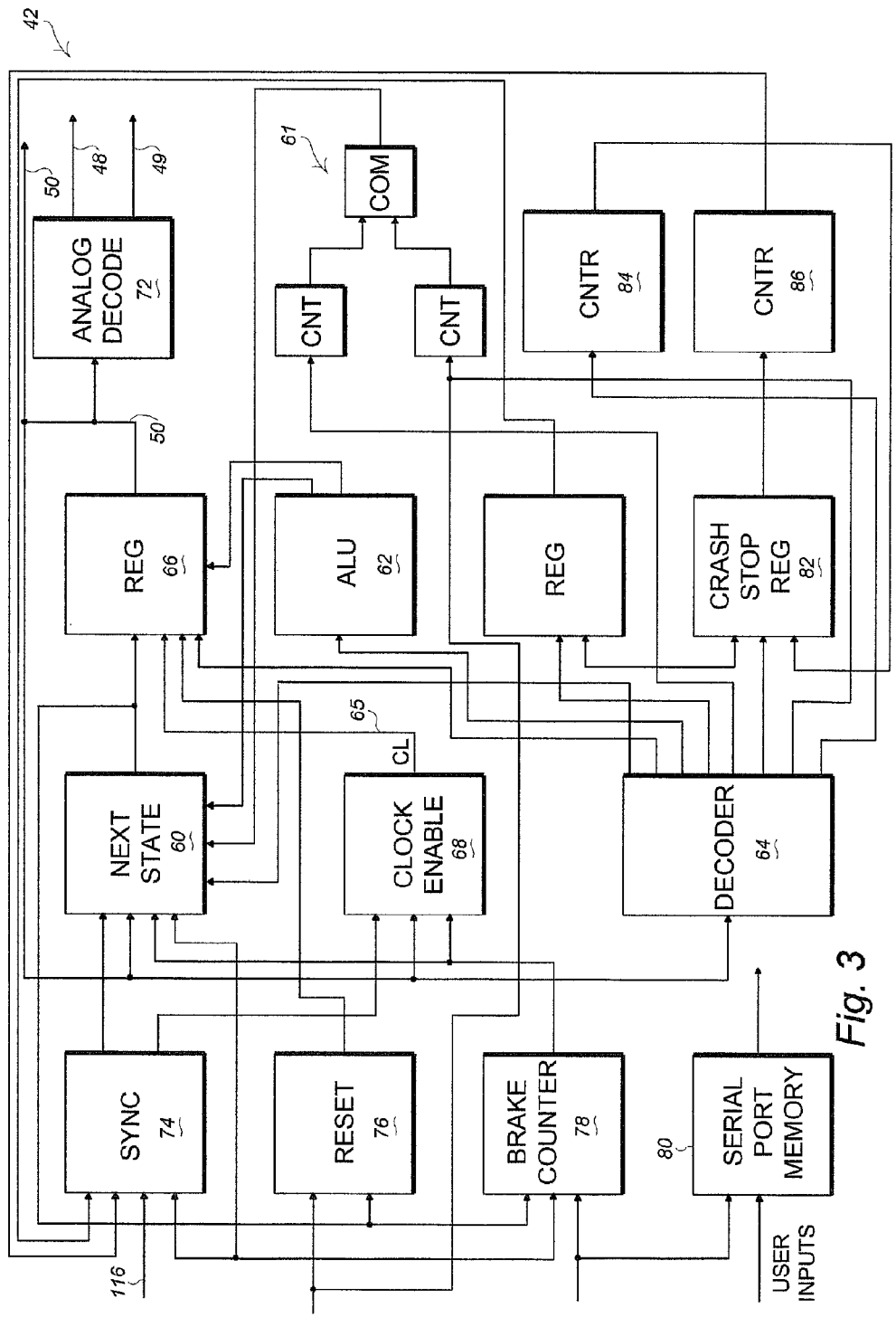
FIG. 3 is a block diagram of the digital control circuitry of the retract circuitry of FIG. 2, in accordance with a preferred embodiment of the invention.

With reference additionally now to FIG. 3, a block diagram is shown, illustrating greater details of the digital component box 42 of FIG. 2. It should be understood that the box interconnections are abbreviated as single lines for clarity, but those skilled in the art will recognize that most connections shown generally represent multi-line connections, digital buses, and the like. The digital component circuit 42 has a Next State block 60 and Clock Enable block 68 that control the operation of the entire retract circuit 40, and in particular support the functions of the state machine 55 that is described below in FIG. 6.

More particularly, the Next State block 60 and Clock Enable block 68 operate to configure the retract circuit 40 to operate in any one of the operating modes described above in Table 1. More particularly, the Next State block 60 and Clock Enable block 68 may configure the state machine to operate in a constant voltage mode in which a constant retract voltage is applied to the voice coil motor 22 when a retract signal is enabled. The Next State block 60 and Clock Enable block 68 may also configure the state machine to operate in a velocity detect mode in which the drive signals are removed from the voice coil motor (i.e., the voice coil motor floats), a velocity of the head assembly 17 is determined, and an appropriate constant retract voltage is applied to the voice coil motor 22.

This procedure is then repeated until the carriage voltage is measured to be the commanded carriage voltage at which time a constant voltage is applied to the carriage. Next State block 60 and Clock Enable block 68 may also configure the state machine to operate in a Fixed Time-out mode in which the drive signals are removed from the voice coil motor (i.e., the voice coil motor floats), a velocity of the head assembly 17 is determined, and an appropriate constant retract voltage is applied to the voice coil motor 22. This procedure is repeated until the system has been unable to reach the commanded voltage for 16 counts, at which time a constant voltage is applied to the carriage.

Finally, Next State block 60 and Clock Enable block 68 may configure the state machine to operate in a crash-stop-detect mode in which a condition is detected where the head assembly 17 is already against the crash stop, and a constant voltage is applied to the voice coil motor 22 to hold the head assembly 17 thereagainst.

The transitions of the state machine are defined by the next state memory 60, which takes as its inputs signals from the arithmetic logic unit 62, the user through synchronizer 74 and various memory cells. The output of the next state memory 60 is clocked into register 66 that is clocked by a clock signal on line 65 from a clock enable circuit 68 at those times when a state transition is needed on current state signals on register output lines 50. Some of the digital states contained in the register 66 are provided from output lines 50 as digital output signals to various parts of the control circuitry 10 (see FIG. 1), and others are converted by an analog decode circuit 72, which provides analog control signals on output buses 48 and 49 to the analog component box 44, described below in FIG. 4. Still others are converted by a digital decode circuit 64, which provides digital control signals on output buses to the ALU 62 various memory cells, and other blocks on the servo controller. The time that the state machine remains in any particular state is determined by a timing control circuit 61.

The input control signals 116 are synchronized by a synchronization circuit 74, and the circuit is reset asynchronously by a reset circuit 76. A brake counter 78 is provided to time the braking of the spindle motor 14. Finally, a serial port memory 80 is provided to locally contain the serial port commands programmed by the user.

The circuit 42 includes a crash stop detector circuit, which has a register 82 and a counter 86. (A crash stop is a condition in which the head mechanism is overdriven to a retract position, or is already in full retract position and against a crash-stop barrier.) The circuit functions to determine whether the head is already against the crash stop barrier by comparing the output of counter 86 with a predetermined count value. The counter may be, for example, a 3-bit counter, with a predetermined count contained in a crash stop memory. The decoder detects the movement of the head mechanism, and if it detects a very slow movement of the head, it increases the count value of counter 86. If the predetermined count is reached, it is determined that the head is moving slowly because in fact it is resting against the crash stop barrier. If it is ever determined that the carriage assembly is moving faster than a preset value, then the output of the counter is cleared and its output becomes zero. The crash stop detector circuit also can detect a crash stop if the carriage assembly at one point in time is moving toward the crash stop and then at the next measurement is moving away from the crash stop. The current direction of the carriage assembly is first compared to the previous direction which is stored in a register. If the and current direction is away from the crash stop, and the previous direction was towards the crash stop, then it is assumed that the carriage assembly struck the crash stop and the state machine progresses on to a constant voltage retract. If the above condition is not met, then it is determined that the carriage assembly did not strike the crash stop, and the current carriage assembly direction is stored in a register and the Next State block 60 and Clock Enable block 68 work to drive the carriage assembly to the crash stop.

More particularly, the crash stop detect has two techniques for determining that the carriage is against the crash stop. In the first method, the circuitry looks to see if the carriage has been detected with close to zero velocity for several samples in a row. The number of samples in a row in which there has been no movement is stored in a register. When this count equals the programmed count, the circuitry determines that the head is against the crash stop.

In the second method, the circuitry records the direction of velocity on a sample. On the next sample, the circuitry determines measures the velocity again. If the velocity went from a positive velocity to a negative velocity, then it is assumed that this large speed change resulted in having struck the crash stop.

In both methods, after detecting that the arm is in the vicinity of the crash stop, a constant voltage is applied to the coil.

Figure 4:
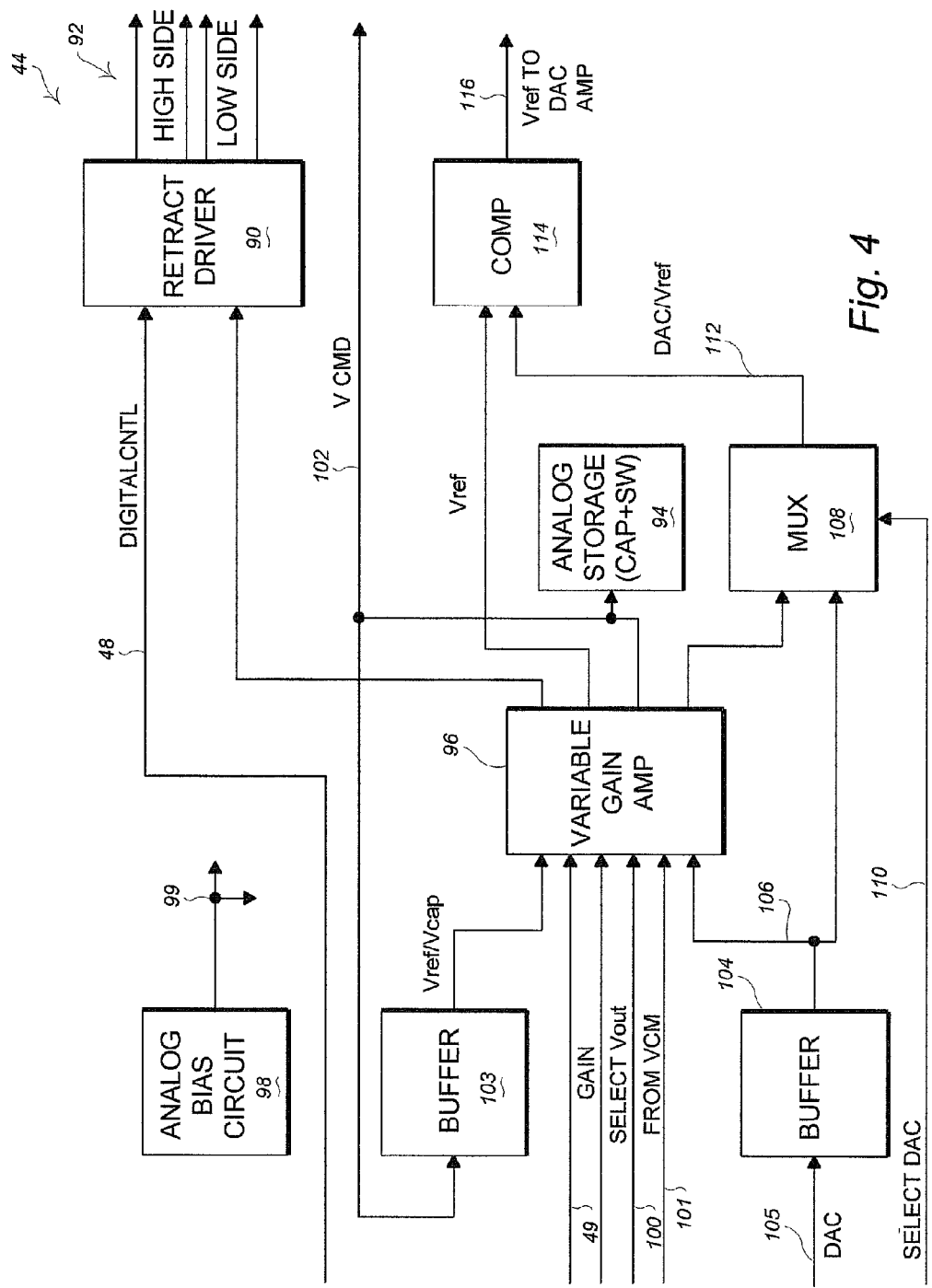
FIG. 4 is a block diagram of the analog control circuitry of the retract circuitry of FIG. 2, in accordance with a preferred embodiment of the invention.

With reference additionally now to FIG. 4, a block diagram is shown, illustrating greater details of the analog component circuit 44 of FIG. 2. It should be understood that the box interconnections may be abbreviated as single lines for clarity, but those skilled in the art will recognize that most connections shown may represent multi-line connections, digital buses, analog buses, single analog lines, and the like. The analog component circuitry 44 includes a retract driver circuit 90 to provide retract drive signals to the VCM 22 on output lines 92, the signals being of voltage determined by the state machine of the digital circuitry 42 described above, in the manner described below.

The various elements of the analog component circuitry 44 receive bias voltage or currents from a bias circuit 98 on output lines 99. Biasing techniques being well known, the specific bias interconnections are not shown.

The circuit 44 receives its inputs from the digital component circuitry 42 described above with reference to FIG. 3 on input buses 48 and 49. The digital control bus 48 connects directly to the retract driver 90, and the control bus 49 connects to the variable gain amplifier 96. Inputs are also received from the VCM on lines 101.

An analog charge storage device 94 is provided, which functions as described below. The analog charge storage device 94 may be, for example, a capacitor and switch appropriately connected to enable voltage to be selectively applied to, or drained from the capacitor in operation. The charge on the analog storage device 94 is controlled by an output from the variable gain amplifier (VGA) 96, which, in turn, is controlled by a select line 100 from the digital control circuitry 42. More specifically, the variable gain amplifier 96 is controlled by the select signal 100 to produce on its output line 102 either an error voltage from the VGA or the voltage that is existing on the analog charge storage device 94. The output from the variable gain amplifier 96 on line 102 is connected to a buffer amplifier 103, which produces on its output either a reference voltage $V_{REF}$ or the capacitor voltage, $V_{CAP}$, which is output on line 103. The output from the buffer amplifier 103 is connected back to the variable gain amplifier 96.

The non-inverting buffer 104 receives at its input on line 105 the voltage produced by a digital-to-analog converter (DAC) (not shown), produced in the operation of the state machine of circuit 42 below described to produce on its output the buffered analog signal representing the voltage specified by the digital circuit 42. The output from the buffer 104 on line 106 is applied to an input of the variable gain amplifier (VGA) 96 a multiplexer 108 and also to variable gain amplifier (VGA) 96. The other input of the multiplexer 108 receives a reference voltage $V_{REF}$ from the variable gain amplifier 96. The selection between the reference voltage $V_{REF}$ and the DAC output on line 106 is controlled by a selection signal on line 110, which is developed by the state machine. The output of the multiplexer 108 is produced on line 112, representing either the reference voltage from the variable gain amplifier 96 or the value contained in the DAC received from the buffer 104.

A comparator 114 receives on one of its inputs the output line from the multiplexer 106, and another of its inputs an output from the variable gain amplifier 96, which represents a voltage difference, below described. The output on line 116 therefore indicates whether the DAC or the reference voltage exceeds the command voltage from the variable gain amplifier, and is fed back to the digital component circuitry 42 for use in the state machine determination of whether the DAC command voltage is larger than the voltage across the voice coil 22.

Figure 5:
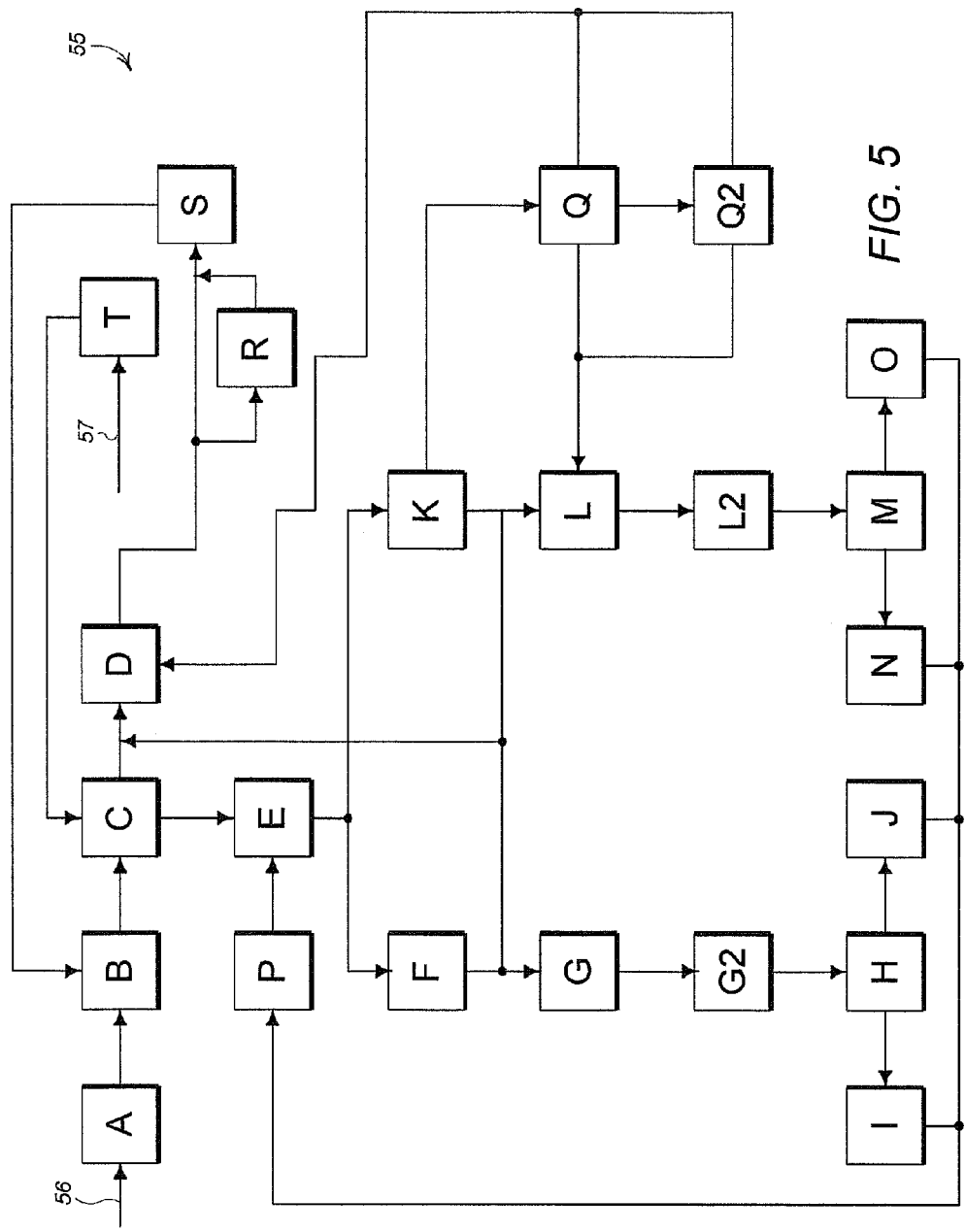
FIG. 5 is a state diagram of the state machine used in the retract circuitry of FIG. 2, in accordance with a preferred embodiment of the invention.

FIG. 5, to which reference is now additionally made, is a state diagram of the state machine 55 used in and to control the retract circuitry 40 of FIG. 2, in accordance with a preferred embodiment of the invention. In its current embodiment, the state machine 55 can be entered by either of two paths, the first into state "A" and the second into state "T", as below described. It may be needed to have other means of entry into the state machine, but all of these are still permissible within the constructs of this patent. Entry into state A may be asynchronously initiated by the setting of the reset signal on the input line 56. Of course, each state is characterized by a set of digital signals defined by the "next state" circuit 60, described in FIG. 3 above, to be contained in the register 66 for application to control the various circuit elements as described herein. Thus, as the digital data associated with each state is applied to the analog circuitry 44, described in FIG. 4 above, the various functions are effected. Therefore, below described are the resulting functions of the various states of the state machine 55.

State "A" operates to start the initial power up of the retract circuitry and to clear the brake that exists on the spindle and VCM motors. After initial startup, the retract enable signal, RET_EN on line 56 is set equal to 0, so that the state machine enters a default "retract asleep" state in state "B" to conserve power. Once in state "B", the state machine remains there until the retract enable signal, RET_EN on input line 56, changes state.

In the event that a retract operation is called for, the state of the retract enable signal, RET_EN, is changed, for example, in the embodiment shown, from 0 to 1. When this occurs, the state machine moves to state "C". In state "C", a "retract awakening" function occurs, where the sleep state in which the retract circuitry previously reposed is reversed, and retract power is applied to the VCM 22 according to the specified user protocol or mode. The various user programmable modes are indicated in Table 1 above. At this juncture, depending upon the user programmed mode (which may be programmed, for example, via he serial port of the device), the state machine moves either to state "D" or state "E". More particularly, if the user programmed mode is "constant voltage" (Code 00), the state machine moves to state "D". If the user programmable mode is anything else, the state machine moves to state "E".

Following first the operation from state "D", as specified by Code 00, the analog circuit 44 is operated to merely apply a constant retract voltage to the VCM 22 to retract it. In this mode, the spindle motor may or may be braked. For example, from state "D", if the brake enable signal "BRK_EN", is high or 1, the state machine enters state "R". In state "R", the state of a voltage fault signal is used to determine the action required. The voltage fault signal may be used to indicate whether the retract command is a result of a failure in the power supply voltage to the device. If the voltage fault signal indicates that a voltage fault has occurred, the spindle motor is braked.

If no voltage fault has occurred, no spindle motor braking is ordered. From state "R", when the retract enable signal, RET_EN, is reset, the state machine is moved to state "S". In state "S", a retract sleep command is issued, the apply brake signal is cleared, and the state machine moves back to state "B", to function therefrom as described above. On the other hand, from state "D", if a clear retract signal occurs, a retract sleep command is issued, the apply brake signal is cleared, and the state machine moves back to state "B", to function therefrom as described above, without moving to state "R".

As mentioned above, if the user programmed mode is other than "constant voltage" mode (Code 00), the state machine 55 moves from state "C" to state "E". In state "E", the voltage across the VCM 22 in a floating state, is compared to a target voltage, and the machine moves into one of two control loops, described below. The target voltage may be a user programmed value. In addition, the direction of the error voltage from the target voltage is determined. Moreover, in the embodiment illustrated, the user may program the time during which the state machine remains in state "E". Typical times may be, for example, 300, 450, 600, 750 microseconds, or other desired value. The time spent in state "E" corresponds to the time that the currents that exist in the VCM 22, such as coil currents, eddy currents, and the like, die down to zero before the BEMF is measured. If currents still exist in the VCM windings, the measured BEMF may not be accurate. However, from a control standpoint, the time spent in state "E" should be short, since the faster the sampling rate, the better the control. In addition, as the time spent in state "E" decreases, the driving frequency increases. As the driving frequency increases, the human ear becomes less sensitive to the noise emitted from the driving coil. Thus, to minimize acoustic noise that is experienced by a user, the user may program the shortest possible time for state "E" that sill allows the current to reach zero.

From state "E", if the voltage across the VCM 22 is greater than the user defined target voltage, the state machine 55 moves to the control loop that includes states "F", "G", "G2", and "H". On the other hand, if the voltage is less than the target voltage, the state machine moves to the control loop that includes states "K", "L", "L2", and "M". If the voltage is substantially equal to the target voltage, it does not matter which control loop is followed, since the results will be substantially the same in either loop. If desired, the circuitry therefore may randomly pick the state path to be followed in this event.

Examining the first control loop that includes the "F", "G", "G2", and "H" states, which are reached if in state "E", the BEMF value is determined to be greater than the target value, a determination is made in state "F" to determine if the voltage difference between the BEMF and target voltage is less than a predetermined tolerance "window." A suitable tolerance window may be, for example, between the target voltage and a voltage that is 5% above the target voltage. If the retract type is Code 01, then if the BEMF voltage is less than the defined maximum error tolerance, i.e., within the window, then the error is considered to be small, and the state machine is moved to state "D". In state "D" a constant voltage is applied to the VCM coil to retract the head assembly 17 On the other hand, If the retract is Code 10 or 11, or if the BEMF is more than 5% above the predefined maximum target value so that the error is considered large, an integrator value is decremented one step (the initial value of the integrator in State "B" is zero), and the state machine moves to state "G"In state "G", the difference between the BEMF and target voltage is again measured, and the absolute value of that measurement is stored on the capacitor in the analog storage circuit 94 (FIG. 4). This is accomplished by closing the associated switch to charge or discharge the capacitor to the determined difference voltage. The state machine then moves to state "G2".

In state "G2", the circuitry continues to output the difference between the commanded and measured voltages; however, in order to maintain the difference voltage that has been established on the capacitor, the switch is opened to assure that subsequent events do not change the stored value to assure that the stored voltage is not incorrect.

The state machine then moves to state "H", in which a feed-forward command is digitally added to the value contained in the integrator. The feed-forward command is the target voltage divided by the driver gain. At this point, two commands exist. The first command is the value that is stored on the capacitor. The second command is a value equal to the feed-forward plus the integrator value command. These commands are indicated by labels $V_{REF}$ and $V_{CMD}$ in FIG. 4. The capacitor command is stored on line 102. The output of buffer 103 is set so that it outputs $V_{CAP}$, which is equal to $V_{CMD}$. The digital integrator plus feed forward is output on line 105. When these two commands are passed to the VGA 96 the VGA will control the retract drivers 90 to force the driving voltage across the VCM 22. However, since both of these commands can be either positive or negative, a determination must be made as to the sign of the sum. If both are positive, then the sum is positive, and the state machine branches to state "J". If both are negative, then the sum will be negative, and the state machine branches to state "I". If one is positive and one is negative, then a determination must be made as to which is larger in order to determine whether the sum is positive or negative, and, in light of this determination, the state machine moves to either state "J" or "I", if the sign is respectively positive or negative. This determination is made in state "H".

Thus, as indicated, depending upon the determined polarity of the target voltage, the state machine moves either to state "I", if the drive sum is negative, or to state "J" if the drive sum is positive. In either state "I" or "J", the VCM is driven with the driving voltage for a time of programmable length, and multiplied by the programmable gain. From either state "I" or "J", the state machine moves to state "P", where the count of the timer counter 61 is cleared. As mentioned above, the timer counter counts to a programmed value and determines how long the state machine stays in a particular state. After the counter has been used, an additional state is needed to reset the counter before the next state if the next state also uses the counter. From state "P", the state machine moves back to state "E" and the cycle is repeated.

As mentioned above, the second control loop that includes states "K", "L", "L2", and "M" states, is reached if in state "E", the BEMF value is determined to be less than the target voltage. In state "K", a determination is made whether the voltage difference between the BEMF of the VCM 22 and user specified target voltage is greater than a predetermined tolerance "window." A suitable tolerance window may be, for example, between the target voltage and 5% below the target voltage. If the retract type is code 01, then if the BEMF voltage is greater than the defined minimum allowed target voltage, i.e., within the window, then the error is considered to be small, and the state machine is moved to state "D". In state "D" a constant voltage is applied to the VCM coil to retract the head assembly 17. On the other hand, if the BEMF is less than 5% below the predefined minimum target value so that the error is considered large, an integrator value is incremented one step (the initial value of the integrator in State "B" is zero), and the state machine moves to state "L". In state "L", the difference between the BEMF and target voltage is again measured, and the absolute value of that measurement is stored on the capacitor of the analog storage circuit 94. This is accomplished by closing the switch therein to charge or discharge the capacitor to the determined difference voltage. The state machine then moves to state "L2".

In state "L2", the circuitry continues to output the difference between the commanded and measured voltages; however, in order to maintain the difference voltage that has been established on the capacitor, the switch is opened to assure that subsequent events do not change the stored value to assure that the stored voltage is not incorrect.

The state machine then moves to state "M", in which a feed-forward command is digitally added to the value contained in the integrator. The feed-forward command is the target voltage divided by the driver gain. At this point, two commands exist. The first command is the value that is stored on the capacitor. The second command is a value equal to the feed-forward plus the integrator value command. The values are respectively seen on lines $V_{REF}$ and $V_{CMD}$ in the analog circuit 44 of FIG. 4. When these two commands are passed to the retract drivers 90, the retract drivers will force the target voltage across the VCM 22. However, since both of these commands can be either positive or negative, a determination must be made as to the sign of the sum. If both are positive, then the sum is positive, and the state machine branches to state "O". If both are negative, then the sum will be negative, and the state machine branches to state "N". If one is positive and one is negative, then a determination must be made as to which is larger in order to determine whether the sum is positive or negative, and, in light of this determination, the state machine moves to either state "O" or "N", if the sign is respectively positive or negative. This determination is made in state "M".

Depending upon the determined polarity of the target voltage, the state machine moves either to state "N", if the drive sum is negative, or to state "O" if the drive sum is positive. In either state "N" or "O", the VCM is driven with the driving voltage for a time of programmable length and multiplied by the programmable gain. From either state "O" or "N", the state machine moves to state "P", where the count of the timer counter 61 is cleared. The timer counter 61 counts to a programmed value and determines how long the state machine stays in a particular state. After the counter has been used, an additional state is needed to reset the counter before the next state if the next state also uses the counter. From state "P", the state machine moves back to state "E" and the cycle is repeated.

In a steady state of operation, the error between the BEMF and the target voltage is zero. The error is defined as the measured VCM voltage (BEMF) minus the commanded VCM voltage (i.e., the target voltage). In the steady state, when the error is zero, every time the VCM motor is driven, it is desirable to drive it with the target voltage. If the VCM is at the target voltage, then if it is also driven with the target voltage, there will be no current forced through the motor. If no current is forced, then the motor will not accelerate, which is as it should be in the steady state condition when the motor is at the correct velocity (where velocity is measured as voltage across the VCM).

In addition to the states described above, two additional states "Q" and "Q2" are defined. States "Q" and "Q2" define the exit states depending upon the user specified mode of operation. More specifically, in state "K", if the operating mode is Code 01 or 11, the state moves to state "Q" if the measured voltage is found to be less than 5% lower than the target voltage, regardless of the voltage comparisons described above that are made in loops "P", "G", "G2", and "H", and "K", "L", "L2" and "M", and exits. On the other hand, Code 10 will cause a transition from state "K" into state "Q" if the integrator is saturated at the positive rail, and if the comparison in state "K" indicates that the BEMF voltage is less than 5% lower than the target voltage.

Only in Code 01 and 11 will the state go into state "Q2" if the comparison in state "Q" indicates that the BEMF voltage is less than the threshold voltage (for example, 25 mV to 50 mV).

State "T" near the top of the state diagram of the state machine 55 may be provided, if desired, to provide a retract under special circumstances in which State B must be left upon immediate reception of a signal, which may be user defined. State "T" is entered by applying a retract signal to input line 57, which moves the state machine 55 immediately to state "T", for operation described above therefrom. Although state "T" is asynchronously entered, that is without waiting for clock 65 or synchronizer 74, it is not left until signal 57 is lowered synchronously with the clock. Signal 57 is generated by reset circuit 76 which handles all asynchronous transitions and ensures that the state machine correctly transitions and does not wind up in an unknown state.

Thus, in a preferred embodiment, the digital state machine is user programmable to operate in constant voltage, velocity detect, fixed time-out, and crash stop detect modes. Preferably, the digital state machine is programmed to one of the last three modes, which seek to control the velocity of the data transducer carriage assembly. The digital state machine also is preferably programmed to detect an error velocity of the data transducer carriage assembly from a difference of a measured voltage across the data transducer driver from a predetermined voltage. As mentioned, the last three retract modes all work in substantially the same way. All of them make a measurement of the velocity error, and then generate a driving voltage to force the velocity error to zero. The only difference among the last three codes is in what manner the state machine is allowed to go into State "D". Code 10 repeats the correction process until the control circuitry has been unable to cause the carriage to reach the desired velocity for 16 counts. Code 11 exits slightly early by trying to detect when the crash stop was hit. Code 11 will still exit if the circuitry is unable to speed up the carriage after 16 counts. Code 01 attempts to exit even earlier than the previous two methods. It tries to go to State "D" when the carriage reaches the correct velocity. If that doesn't happen, it will try to exit based on hitting a crash stop, and finally it will exit to "D" if it counts for 16 cycles and never reaches speed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A retract circuit for retracting a data transducer carriage assembly of a mass data storage device to a retracted position, comprising:
   a digital state machine;
   said digital state machine being user programmable to operate in a selected retract mode;
   an analog control circuit for receiving control signals from said digital state machine for providing analog retract signals to move said data transducer carriage assembly; and
   an analog driver to receive control signals from said digital state machine, said analog driver having a programmable gain.

2. A retract circuit for retracting a data transducer carriage assembly of a mass data storage device to a retracted position, comprising:
   a digital state machine;
   said digital state machine being user programmable to operate in a selected retract mode;
   and an analog control circuit for receiving control signals from said digital state machine for providing analog retract signals to move said data transducer carriage assembly,
   wherein said digital state machine is user programmable to operate in constant voltage, velocity detect, float and pulse, and crash stop detect modes.

3. A retract circuit for retracting a data transducer carriage assembly of a mass data storage device to a retracted position, comprising:
   a digital state machine;
   said digital state machine being user programmable to operate in a selected retract mode;
   and an analog control circuit for receiving control signals from said digital state machine for providing analog retract signals to move said data transducer carriage assembly,
   wherein said digital state machine is programmed to detect a velocity of said data transducer carriage assembly.

4. The retract circuit of claim 3 wherein said digital state machine is programmed to detect an error velocity of said data transducer carriage assembly from a difference of a measured voltage across said data transducer driver from a predetermined voltage.

5. The retract circuit of claim 4 wherein said predetermined voltage is user programmable to a resolution of two bits.

6. The retract circuit of claim 4 wherein said predetermined voltage is user programmable.

7. The retract circuit of claim 4 wherein said predetermined voltage is user programmable to a resolution of more than two bits.

8. A retract circuit for retracting a data transducer carriage assembly of a mass data storage device to a retracted position, comprising:
   means for establishing a digital state machine;
   said means for establishing a digital state machine being user programmable to operate in a selected retract mode;
   and means for establishing an analog control circuit for receiving control signals from said means for establishing a digital state machine for providing analog retract signals to move said data transducer carriage assembly.

9. The retract circuit of claim 8 further comprising means for establishing an analog driver to receive control signals from said means for establishing digital state machine, said means for establishing analog driver having a programmable gain.

10. The retract circuit of claim 8 wherein said means for establishing digital state machine is user programmable to operate in constant voltage, velocity detect, float and pulse, and crash stop detect modes.

11. The retract circuit of claim 8 wherein said means for establishing digital state machine is programmed to detect a velocity of said data transducer carriage assembly.

12. The retract circuit of claim 11 wherein said means for establishing digital state machine is programmed to detect an error velocity of said data transducer carriage assembly from a difference of a measured voltage across said data transducer driver from a predetermined voltage.

13. The retract circuit of claim 12 wherein said predetermined voltage is user programmable.

14. The retract circuit of claim 12 wherein said predetermined voltage is user programmable to a resolution of two bits.

15. The retract circuit of claim 12 wherein said predetermined voltage is user programmable to a resolution of more than two bits.

16. A mass data storage device, comprising:
   a retract circuit for retracting a data transducer carriage assembly of a mass data storage device to a retracted position, including
   a digital state machine;
   said digital state machine being user programmable to operate in a selected retract mode;
   an analog control circuit for receiving control signals from said digital state machine for providing analog retract signals to move said data transducer carriage assembly; and
   an analog driver to receive control signals from said digital state machine, said analog driver having a programmable gain.

17. A mass data storage device, comprising:
a retract circuit for retracting a data transducer carriage assembly of a mass data storage device to a retracted position, including
a digital state machine;
said digital state machine being user programmable to operate in a selected retract mode;
and an analog control circuit for receiving control signals from said digital state machine for providing analog retract signals to move said data transducer carriage assembly,
wherein said digital state machine is user programmable to operate in constant voltage, velocity detect, float and pulse, and crash stop detect modes.

18. A mass data storage device, comprising:
a retract circuit for retracting a data transducer carriage assembly of a mass data storage device to a retracted position, including
a digital state machine;
said digital state machine being user programmable to operate in a selected retract mode;
and an analog control circuit for receiving control signals from said digital state machine for providing analog retract signals to move said data transducer carriage assembly,
wherein said digital state machine is programmed to detect a velocity of said data transducer carriage assembly.

19. The mass data storage device of claim 18 wherein said digital state machine is programmed to detect an error velocity of said data transducer carriage assembly from a difference of a measured voltage across said data transducer driver from a predetermined voltage.

20. The mass data storage device of claim 19 wherein said predetermined voltage is user programmable.

21. The mass data storage device of claim 19 wherein said predetermined voltage is user programmable to a resolution of two bits.

22. The mass data storage device of claim 19 wherein said predetermined voltage is user programmable to a resolution of more than two bits.

23. A method for retracting a data transducer carriage assembly of a mass data storage device to a retracted position, comprising:
providing a user programmable digital state machine to operate in a selected retract mode;
providing analog control circuit in response to signals provided by said digital state machine for providing analog retract signals to said data transducer carriage assembly; and
providing an analog driver having a programmable gain to receive control signals from said digital state machine.

24. A method for retracting a data transducer carriage assembly of a mass data storage device to a retracted position, comprising:
providing a user programmable digital state machine to operate in a selected retract mode;
and providing analog control circuit in response to signals provided by said digital state machine for providing analog retract signals to said data transducer carriage assembly,
wherein said providing a digital state machine comprises providing a digital state machine that is user programmable to operate in constant voltage, velocity detect, float and pulse, and crash stop detect modes.

25. A method for retracting a data transducer carriage assembly of a mass data storage device to a retracted position, comprising:
providing a user programmable digital state machine to operate in a selected retract mode;
and providing analog control circuit in response to signals provided by said digital state machine for providing analog retract signals to said data transducer carriage assembly,
wherein said providing a digital state machine comprises providing a digital state machine that is programmed to detect a velocity of said data transducer carriage assembly.

26. A method for retracting a data transducer carriage assembly of a mass data storage device to a retracted position, comprising:
providing a user programmable digital state machine to operate in a selected retract mode;
and providing analog control circuit in response to signals provided by said digital state machine for providing analog retract signals to said data transducer carriage assembly,
wherein said providing a digital state machine comprises providing a digital state machine that is programmed to detect an error velocity of said data transducer carriage assembly from a difference of a measured voltage across said data transducer driver from a predetermined voltage.

27. The method of claim 16 wherein said predetermined voltage is user programmable.

28. The method of claim 26 wherein said predetermined voltage is user programmable to a resolution of two bits.

29. The method of claim 26 wherein said predetermined voltage is user programmable to a resolution of more than two bits.

30. A retract system for retracting a head assembly in a hard disk drive, comprising:
means for measuring a velocity of a voice coil motor (VCM),
means responsive to a velocity measurement for establishing a retract voltage;
and means for applying said retract voltage to said VCM.

31. The retract system of claim 30 further comprising:
a digital processor for configuring said means for measuring, means for establishing a retract voltage, and means for applying said retract voltage to operate in a plurality of operating modes.

32. The retract system of claim 30 further comprising means for operating said hard disk drive in one of a plurality of selectable operating modes.

33. The retract system of claim 32 wherein said means for operating said hard disk drive in one of a plurality of selectable operating modes comprises means for operating said hard disk drive in a constant voltage mode in which a constant retract voltage is applied to said voice coil motor when a retract signal is enabled.

34. The retract system of claim 32 wherein said means for operating said hard disk drive in one of a plurality of selectable operating modes comprises means for operating said hard disk drive in a velocity detect mode in which drive signals are removed from said voice coil motor, a velocity of said head assembly is determined, and an appropriate constant retract voltage is applied to said voice coil motor.

35. The retract system of claim 32 wherein said means for operating said hard disk drive in one of a plurality of selectable operating modes comprises means for operating said hard disk drive in a a float and pulse mode in which drive signals are removed from said voice coil motor, and a repeating pulse is applied a predetermined number of times.

36. The retract system of claim 35 in which the repeating pulse is applied 32 times.

37. The retract system of claim 32 wherein said means for operating said hard disk drive in one of a plurality of selectable operating modes comprises means for operating said hard disk drive in a crash-stop-detect mode in which a condition in which said head assembly is against crash the stop is detected, and a constant voltage is applied to hold said head assembly thereagainst.

38. In a hard disk drive, a system for moving a head assembly to a retract position, a position of said head assembly being controlled by a voice coil motor, comprising:
an analog section connected to said voice coil motor to apply controllable drive voltages thereto to selectively position said head assembly;
and a digital section connected to receive signals from said analog section and said hard disk drive that reflect operating conditions of said hard disk drive, said digital section including:
a digital state machine defining a number of operating states, said digital state machine moving from state to state in response to conditions in said hard disk drive, and operating to produce digital command signals including a retract command to control said analog section to move said head assembly to said retract position,
and a decoder and digital to analog converter to decode said digital command signals and convert said digital command signals to analog signals for controlling said analog section.

39. The retract system of claim 38 wherein said digital state machine includes states to determine a current velocity of said head assembly and to produce command signals to said analog section to command said analog section to apply a retract voltage related to said current velocity to said voice coil motor.

40. The retract system of claim 38 wherein said digital section contains a digital processor connected to configure said state machine to operate in one of a number of operating modes.

41. The retract system of claim 40 wherein said operating modes includes a constant voltage mode in which a constant retract voltage is applied to said voice coil motor when a retract signal is enabled.

42. The retract system of claim 40 wherein said operating modes includes a velocity detect mode in which drive signals are removed from said voice coil motor, a velocity of said head assembly is determined, and an appropriate constant retract voltage is applied to said voice coil motor.

43. The retract system of claim 40 wherein said operating modes includes a float and pulse mode in which drive signals are removed from said voice coil motor, and a repeating pulse is applied a predetermined number of times.

44. This retract system of claim 43 in which the repeating pulse is applied 32 times.

45. The retract system of claim 40 wherein said operating modes includes a crash-stop-detect mode in which a condition in which said head assembly is against crash the stop is detected, and a constant voltage is applied to hold said head assembly thereagainst.

46. A method for retracting a head assembly in a hard disk drive, comprising the steps for:
measuring a velocity of a voice coil motor (VCM) to determine a measured velocity,
establishing a retract voltage responsive to said measured velocity;
applying said retract voltage to said VCM; and
operating said hard disk drive in one of a plurality of selectable operating modes,
wherein said operating said hard disk drive in one of a plurality of selectable operating modes comprises operating said hard disk drive in a constant voltage mode in which a constant retract voltage is applied to said voice coil motor when a retract signal is enabled.

47. A method for retracting a head assembly in a hard disk drive, comprising the steps for:
measuring a velocity of a voice coil motor (VCM) to determine a measured velocity,
establishing a retract voltage responsive to said measured velocity;
applying said retract voltage to said VCM; and
operating said hard disk drive in one of a plurality of selectable operating modes,
wherein said operating said hard disk drive in one of a plurality of selectable operating modes comprises operating said hard disk drive in a velocity detect mode in which drive signals are removed from said voice coil motor, a velocity of said head assembly is determined, and an appropriate constant retract voltage is applied to said voice coil motor.

48. A method for retracting a head assembly in a hard disk drive, comprising the steps for:
measuring a velocity of a voice coil motor (VCM) to determine a measured velocity,
establishing a retract voltage responsive to said measured velocity;
applying said retract voltage to said VCM; and
operating said hard disk drive in one of a plurality of selectable operating modes,
wherein said operating said hard disk drive in one of a plurality of selectable operating modes comprises operating said hard disk drive in a float and pulse mode in which drive signals are removed from said voice coil motor, and a repeating pulse is applied a predetermined number of times.

49. The method of claim 48 in which the repeating pulse is applied 32 times.

50. A method for retracting a head assembly in a hard disk drive, comprising the steps for:
measuring a velocity of a voice coil motor (VCM) to determine a measured velocity,
establishing a retract voltage responsive to said measured velocity;
applying said retract voltage to said VCM; and
operating said hard disk drive in one of a plurality of selectable operating modes,
wherein said operating said hard disk drive in one of a plurality of selectable operating modes comprises operating said hard disk drive in a crash-stop-detect mode in which a condition in which said head assembly is against crash the stop is detected, and a constant voltage is applied to hold said head assembly thereagainst.

* * * * *